United States Patent
Kikuchi et al.

[11] Patent Number: 5,911,030
[45] Date of Patent: Jun. 8, 1999

[54] VIDEO AND AUDIO EDITING SYSTEM

[75] Inventors: Tsuneyuki Kikuchi, Kanagawa; Takashi Sameshima, Tokyo, both of Japan

[73] Assignee: NEC Corporation, Tokyo, Japan

[21] Appl. No.: 08/685,559

[22] Filed: Jul. 24, 1996

[30] Foreign Application Priority Data

Jul. 24, 1995 [JP] Japan ................................ 7-186789

[51] Int. Cl.$^6$ .................................................. H04N 9/79
[52] U.S. Cl. .............................. 386/55; 386/62; 360/13
[58] Field of Search .................................. 386/4, 52, 54, 386/55, 60, 62, 64; 360/13; 369/83; 395/100; H04N 9/79

[56] References Cited

U.S. PATENT DOCUMENTS

| | | | |
|---|---|---|---|
| 4,974,178 | 11/1990 | Izeki et al. ............................ | 364/523 |
| 5,181,114 | 1/1993 | Richards et al. ...................... | 358/146 |
| 5,307,445 | 4/1994 | MacKay ................................ | 395/154 |
| 5,339,393 | 8/1994 | Duffy et al. .......................... | 395/161 |
| 5,386,581 | 1/1995 | Suzuki et al. ........................ | 395/800 |
| 5,388,197 | 2/1995 | Rayner ................................. | 395/154 |
| 5,404,316 | 4/1995 | Klingler et al. ...................... | 364/514 |
| 5,561,457 | 10/1996 | Cragun et al. ......................... | 348/13 |
| 5,568,275 | 10/1996 | Norton et al. ......................... | 386/52 |

FOREIGN PATENT DOCUMENTS

| | | |
|---|---|---|
| A0176324 | 4/1986 | European Pat. Off. . |
| A0438299 | 7/1991 | European Pat. Off. . |
| A7-23341 | 1/1995 | Japan . |
| WO93 08664 | 4/1993 | WIPO . |

*Primary Examiner*—Thai Tran
*Assistant Examiner*—Vincent Boccio
*Attorney, Agent, or Firm*—Sughrue, Mion, Zinn Macpeak & Seas, PLLC

[57] ABSTRACT

A video and audio editing system which eliminates failures in the fetching of video or audio data. The video and audio editing system also accounts for the silence which occurs at the top of audio data and the problems which arise when compressed video and audio data are reproduced simultaneously but not synchronously. The system includes a start time table and an end time table for storing a processing start time and a processing end time, respectively, for each scene to be fetched, a time lag inputting apparatus for inputting time lags in fetching of an external apparatus and an audio board, a table updating apparatus for updating contents of the start and end time tables based on the inputted time lags, and a controller for referring to the contents of the start and end time tables to control fetching start and end times of video data and audio data or control reading start and end times from the storage medium and fetching or reading out the audio data skipping silence data corresponding to the time lags.

9 Claims, 12 Drawing Sheets

| TABLE NUMBER | VIDEO START TIME | VIDEO END TIME | AUDIO START TIME | AUDIO END TIME4 |
|---|---|---|---|---|
| 1 | 1800 | 3600 | 1760 | 3560 |
| 2 | 8000 | 8900 | 7960 | 8860 |
| ⋮ 20 | | | | |

PRIOR ART

FIG. 11(b)

PRIOR ART

VIDEO AND AUDIO EDITING SYSTEM

BACKGROUND OF THE INVENTION

1. Field of the Invention

This invention relates to a video and audio editing system, and more particularly to an editing system for controlling an external apparatus by means of a personal computer (PC) to select video and audio materials of a required scene and store them as data for a multimedia application.

2. Description of the Related Art

A system which employs, for example, an application software program "Vidcap.exe" which operates on the operating system "Windows 3.1" offered by Microsoft, United States, is known as an editing system which controls an external apparatus by means of a personal computer to select video and audio materials of a required scene and input, compress and store data of them to, by and in the personal computer.

Figure 10:
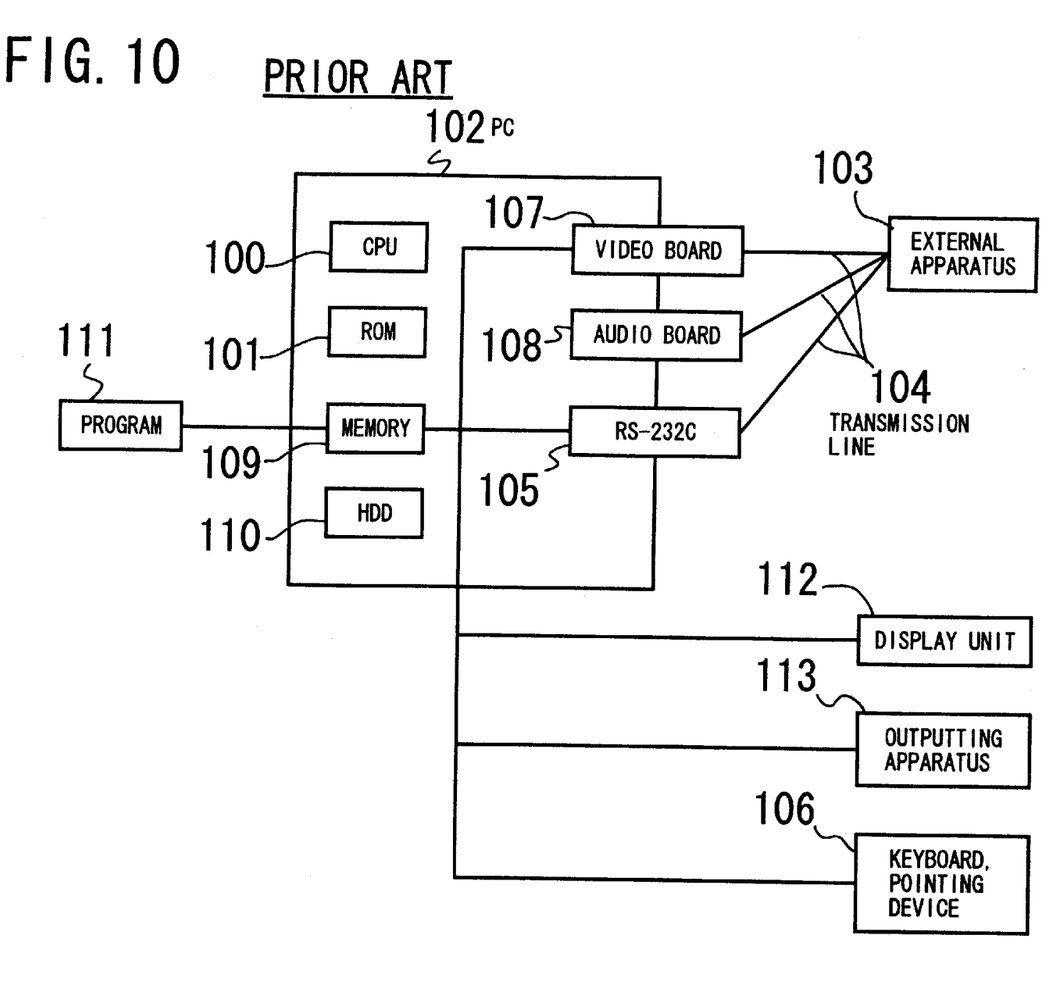
FIG. 10 is a block diagram showing a construction of a conventional video and audio editing system.

FIG. 10 shows in block diagram a construction of the system mentioned above.

Referring to FIG. 10, the system shown includes a personal computer (PC) 102 including a CPU (Central Processing Unit) 100 and a ROM 101 and an external apparatus 103 connected to the personal computer 102 via a transmission line 104 and an RS232C interface 105. The system further includes an instruction inputting apparatus 106 such as a keyboard or a pointing device by which instructions are entered by an operator, a video board 107 and an audio board 108 for fetching video data and audio data from the external apparatus 103 into the personal computer 102 via transmission lines 104, a memory 109 which is used to compress fetched data, a hard disk drive unit (HDD) 110 for storing the compressed data, a program 111 stored in the memory of the personal computer 102 which controls the operation of the personal computer 102, a display unit 112 which displays image data before and after the data are fetched into the personal computer 102, and an outputting apparatus 113 for outputting audio data.

The video board 107 is a hardware element for receiving video data inputted from the external apparatus 103 and storing the received data into a memory area which can be accessed by the personal computer 102.

If start and end times of a scene to be fetched are set by an operator and then an execution instruction is issued, the program 111 controls the external apparatus 103 to first shift the read point to the start time and then successively fetch video data successively feeding each frame of video data so that the fetched video data can be compressed and stored until the end time comes.

Then, in order to fetch analog audio data, the read point is shifted to the start time again and then a reproduction instruction is issued to the external apparatus 103, whereafter a recording instruction is issued to the audio board 108 so that fetched audio data are temporarily stored in a storage medium until the end time comes. Then, after the fetching is completed, the steps of reading in, compressing and storing are performed again. Thereafter, the tops of the compressed video and audio data are adjusted to each other to establish a relation between them in terms of time.

Figure 11A:
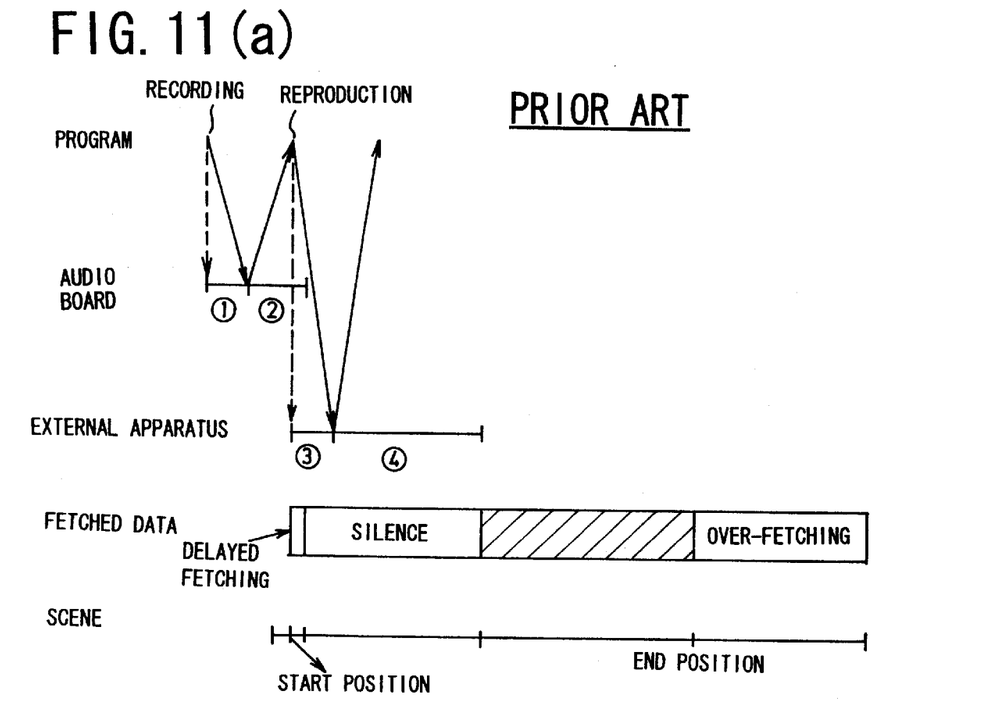
FIGS. 11(a) and 11(b) are time charts illustrating fetch processing for analog audio data in the conventional video and audio editing system of FIG. 10.
Figure 11B:
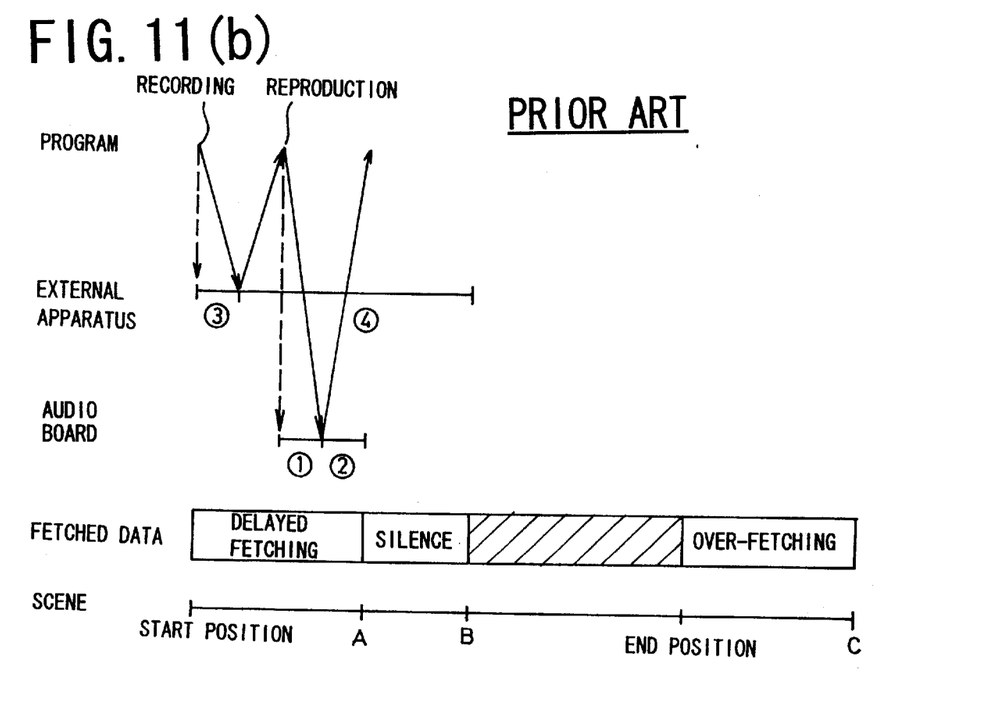

Problems of the conventional video and audio editing system described above will be described below with reference to a time chart for the fetch processing of the analog audio data of FIGS. 11(a) and 11(b). FIG. 11(a) illustrates analog audio data fetch processing when reproduction is performed after recording, while FIG. 11(b) illustrates analog audio data fetch processing when recording is performed after reproduction. Each arrow mark in FIGS. 11(a) and 11(b) represents a route of issuance of an instruction, and the axis of abscissa represents the time.

Referring first to FIG. 11(a), when a recording instruction is first issued to the audio board 108 and then a reproduction instruction is issued to the external apparatus 103 based on the program 111, the following time lags 1, 2, 3 and 4 must be taken into consideration:

1 a time lag after a recording instruction is issued based on the program 111 until the audio board 108 receives the instruction;

2 another time lag after the audio board 103 receives the instruction until it operates, 3 a further time lag after a reproduction instruction is issued based on the program 111 until the external apparatus 103 receives the instruction; and 4 a still further time lag after the external apparatus 103 receives the instruction until it operates.

Due to the time lags, the time at which the audio board 108 actually starts recording is later at a time A than the set start time; the time at which data are inputted to the audio board 108 is later at a time B than the start time; and the time at which recording is ended is later at a time C delayed from the set end time. Consequently, the audio board 108 fails to fetch the audio data from the start time to the time A, and the audio data from the time A to the time B exhibit silence (absence of sound). As a result, when the compressed video and audio data are reproduced simultaneously, the sound is reproduced earlier than the image.

SUMMARY OF THE INVENTION

It is an object of the present invention to provide a video and audio editing system which eliminates certain problems associated with video or audio data which fails to be fetched and with the top of audio data which exhibits silence. In addition, the present invention accounts for the problems which result when compressed video data and audio data are reproduced simultaneously, but the image and the sound are not reproduced synchronously.

In order to attain the object described above, according to an aspect of the present invention, there is provided a video and audio editing system wherein video data and audio data are fetched from an external apparatus onto a computer via a video board and an audio board, respectively, and stored in a storage medium. The video and audio editing system is constructed such that operations from fetching to storing cannot be performed on the real time basis. The video and audio editing system comprises a start time table and an end time table for storing a processing start time and a processing end time, respectively, for each scene to be fetched, time lag inputting means for inputting time lags in fetching audio data from the external apparatus and the audio board, table updating means for updating contents of the start time table and the end time table based on the inputted time lags, and control means for referring to the contents of the start time table and the end time table to control a reading start time and a reading end time from the storage medium and reading out the audio data from the storage medium while skipping silence data corresponding to the time lags.

According to an aspect of the present invention, there is provided a video and audio editing system wherein video data and audio data are fetched from an external apparatus onto a computer via a video board and an audio board, respectively, and stored onto a storage medium, where the video and audio editing system is constructed such that operations including fetching and storing cannot be performed on a real time basis, the video and editing system comprising a start time table and an end time table for storing a processing start time and a processing end time, respectively, for each scene to be fetched, time lag inputting means for inputting time lags in fetching audio data from the external apparatus and the audio board, table updating means for updating contents of the start time table and the end time table based on the inputted time lags, and control means for referring to the contents of the start time table and the end time table to control fetching start times and fetching end times of video data and audio data and fetching the audio data while skipping silence data corresponding to the time lags.

In both of the video and audio editing systems described above, the time lag inputting means may include means for acquiring a first time lag which is a time by which audio data are fetched later or earlier than the fetching start time designated by an operator and means for acquiring a second time lag which is a time by which the fetched audio data exhibit silence beginning with the top thereof, and the table updating means may update the contents of the start time table and the end time table based on the first and second time lags.

The time lag inputting means may also be an instruction inputting apparatus manually operated by an operator who arbitrarily inputs a time lag.

In both of the video and audio editing systems described above, the contents of the start and end time tables are updated based on the time lags inputted by the time lag inputting means, and the fetched audio data are read including skipping silence data beginning with the top thereof. Consequently, situations can be eliminated in which data cannot be fetched successfully, silence is present at the top of data, or synchronism is not established when compressed video and audio data are reproduced simultaneously.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
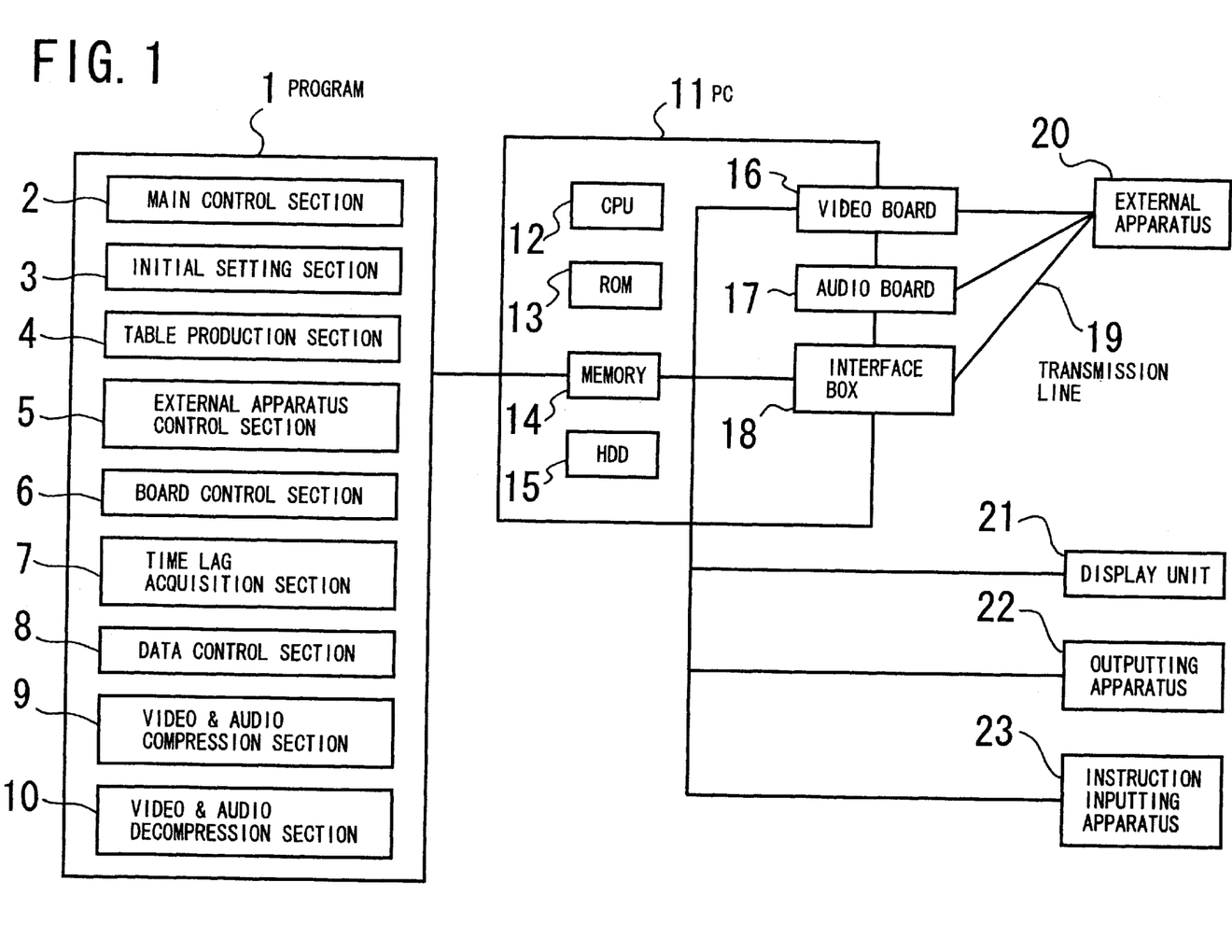
FIG. 1 is a block diagram of a video and audio editing system showing a preferred embodiment of the present invention.

Referring to FIG. 1, there is shown in block diagram a video and audio editing system in which the present invention is applied. The video and audio editing system shown includes a personal computer (PC) 11 and an external apparatus 20 connected to each other by a transmission line 19 and an interface box 18. The interface box 18 includes an interface for bidirectional communications such as, for example, an RS232C interface so that the personal computer 11 and the external apparatus 20 can exchange instructions with each other via the interface box 18 so as to allow the personal computer 11 to utilize all functions of the external apparatus 20, such as reproduction, stopping and pause. A CPU 12 in the personal computer 11 operates in accordance with a BIOS (Basic Input Output System) stored in a ROM 13 and a program 1 stored in a memory 14.

Video data sent from the external apparatus 20 are inputted to a memory in a video board 16 and outputted as they are to a display unit 21 and simultaneously transferred, based on an instruction of the program 1, to the memory 14 in the personal computer 11 and a hard disk drive unit (HDD) 15. Then, the video data are compressed and recorded onto a storage medium such as a hard disk.

Similarly, analog audio data from the external apparatus 20 are inputted to a memory in an audio board 17 and outputted as they are to an outputting apparatus 22 and simultaneously transferred, based on an instruction of the program 1, to the memory 14 in the personal computer 11 and to the hard disk drive unit 15. Then, the audio data are compressed and recorded onto the storage medium such as a hard disk.

An operator will input an instruction using an instruction inputting apparatus 23 such as a keyboard or a pointing device.

The program 1 includes functions, such as an initial setting section 3 for initializing the video board 16 and the audio board 17 and establishing a working area in the memory 14, and a table production section 4 including a table production sub-section for producing a start time table and an end time table for storing processing start times and processing end times of a video material and corresponding audio material to be fetched in response to an instruction of an operator and a table updating subsection for updating contents of the tables based on time lags.

Additional functions of the program 1 include an external apparatus control section 5 for controlling the external apparatus 20 based on the contents of the tables, a board control section 6 for controlling the video board 16 and the audio board 17, and a time lag acquisition section 7 including a sub-section for acquiring a time (first time lag) by which audio data are to be fetched later or earlier than the fetching start time designated by the operator and another sub-section for acquiring another time (second time lag) by which silence successively appears in fetched audio data beginning with the top of the same. Other functions of the program 1 include a main control section 2, a data control section 8, a video compression section 9 and a video and audio decompression section 10.

The data control section 8 includes a sub-section for skipping silence data when audio data to be temporarily stored in a storage medium are read in. The silence data begins with the top of the audio data. The data control section 8 also includes another sub-section for skipping silence data when audio data are transferred from the audio board 17 to a memory area of the personal computer 11, the silence data beginning with the top of the audio data. The video and audio compression section 9 compresses the fetched video and audio data, whereas the video and audio decompression section 10 restores video data and audio data in order to confirm the stored data. Finally, the main control section 2 controls all of the other sections or modules.

Figure 2:
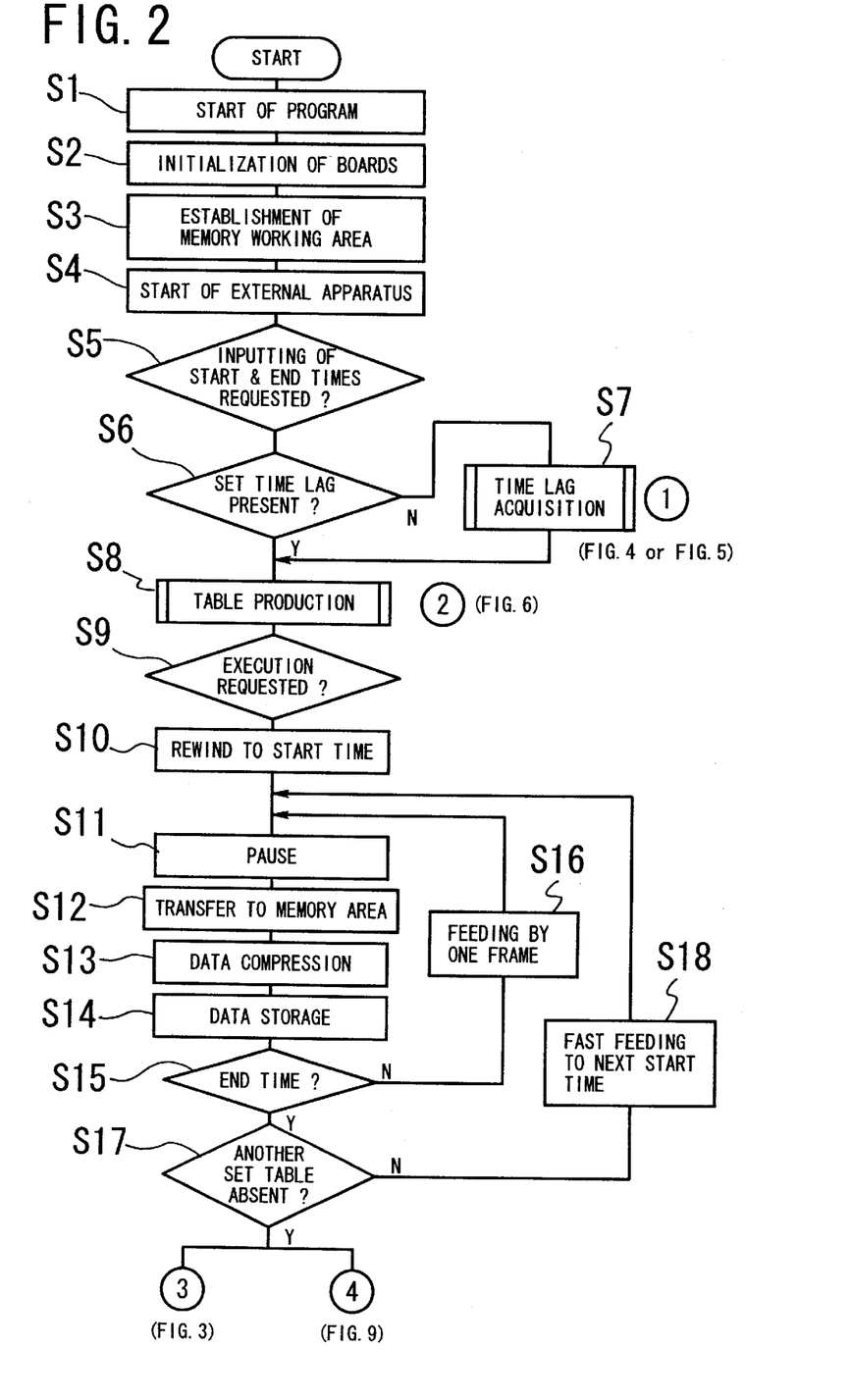
FIG. 2 is a flow chart illustrating video data fetch processing of the video and audio editing system of FIG. 1.

FIG. 2 is a flow chart illustrating data fetch processing by the video and audio editing system shown in FIG. 1. Referring to FIG. 2, after the program 1 is started in response to an instruction of an operator (step S1), the video board 16 and the audio board 17 are initialized (step S2) and areas necessary for storage and compression of data are established in the memory 14 of the personal computer 11 (step S3). Thereafter, the external apparatus 20 connected to the system is started (step S4).

Figure 7:
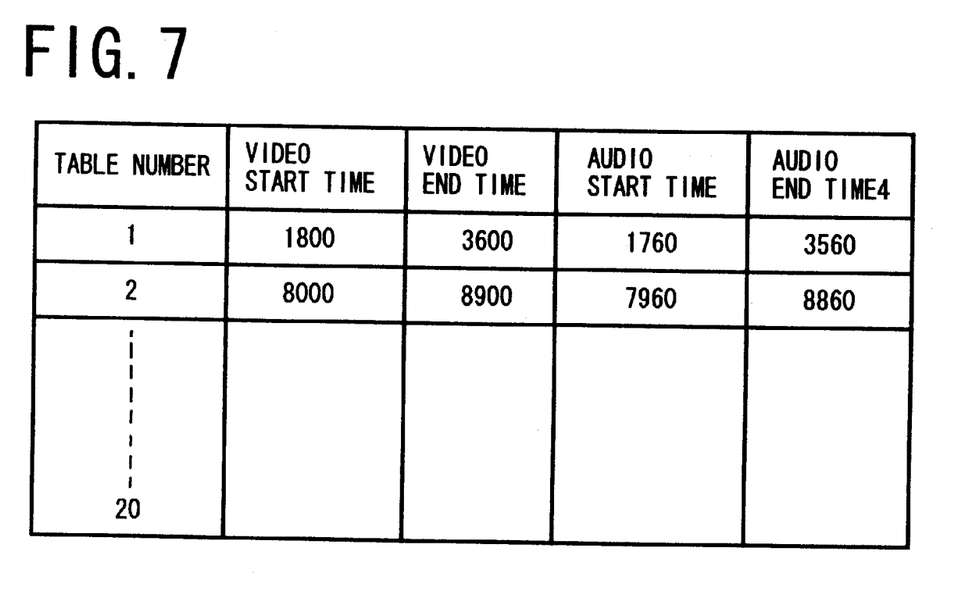
FIG. 7 is a view showing a table produced by the process illustrated in FIG. 6.

Then, if the operator controls the external apparatus 20 via the instruction inputting apparatus 23 to input fetching start and end times of a required scene (step S5), it is recognized whether or not time lags are set in advance (step S6). If time lags are not set, then time lags are acquired by the time lag acquisition section 7 (step S7). The tables illustrated in FIG. 7 are produced by the table production section 4 (step S8). The acquisition of time lags is performed before video and audio data are actually fetched. However, upon the acquisition, of the time lags fetching of video data is not performed. In this instance, the operator will select a location of audio data of a scene to be fetched at which the top of the audio data represents presence of sound without fail.

Figure 4:
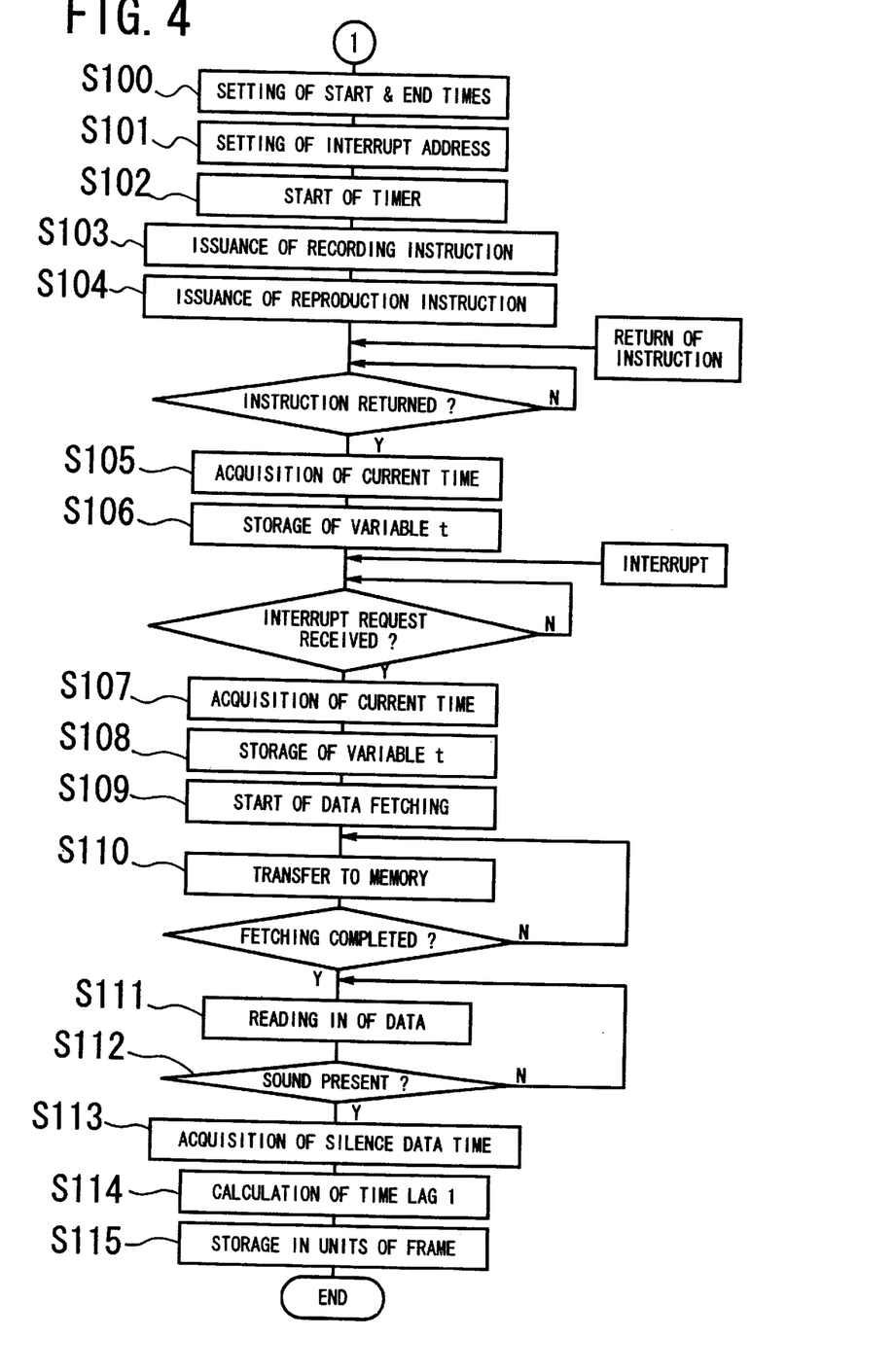
FIG. 4 is a flow chart illustrating processing for acquiring a time lag in the video and audio editing system of FIG. 1 when a reproduction instruction is issued after a recording instruction.
Figure 5:
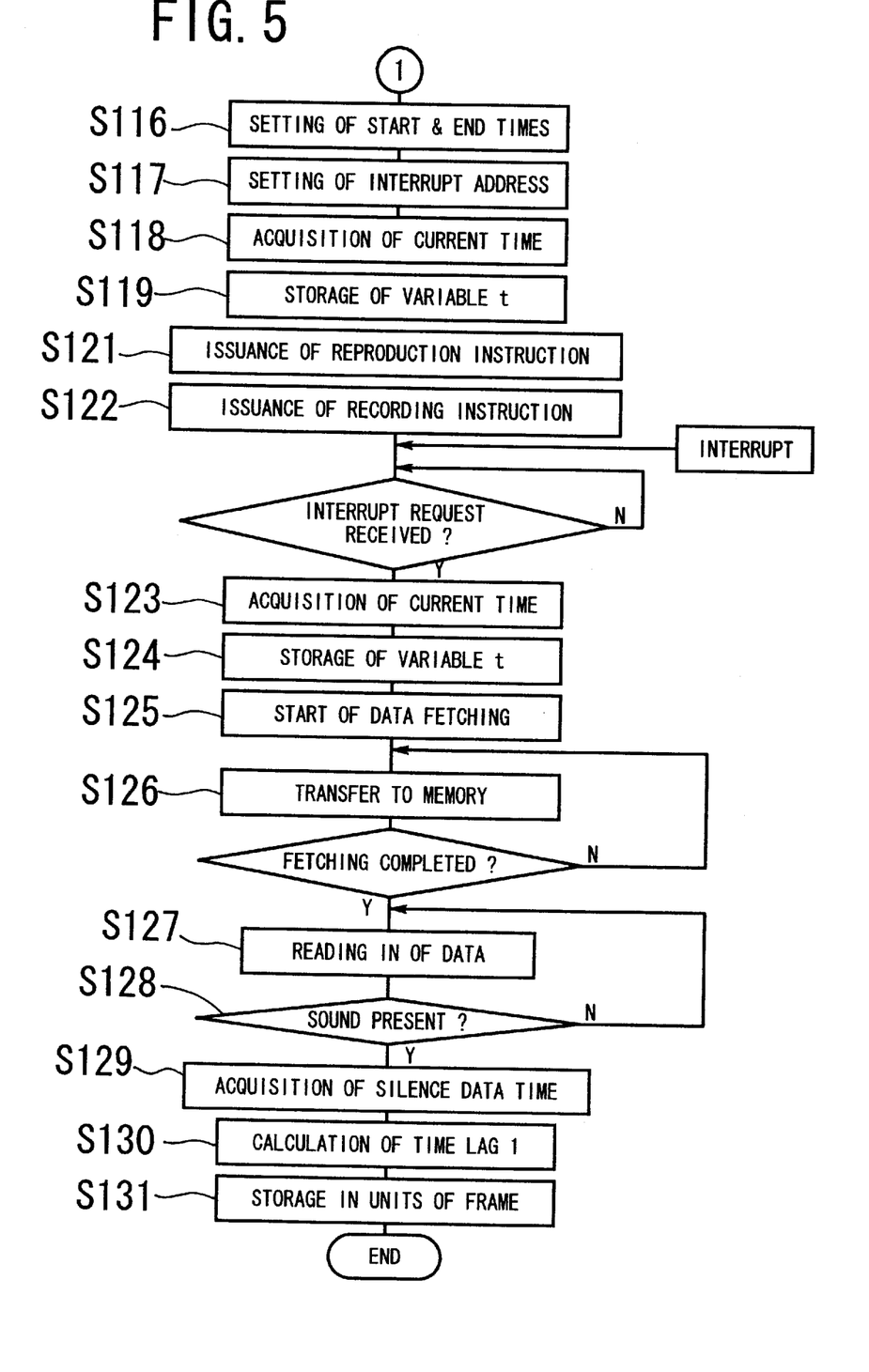
FIG. 5 is a flow chart illustrating processing for acquiring a time lag in the video and audio editing system of FIG. 1 when a recording instruction is issued after a reproduction instruction.
Figure 12A:
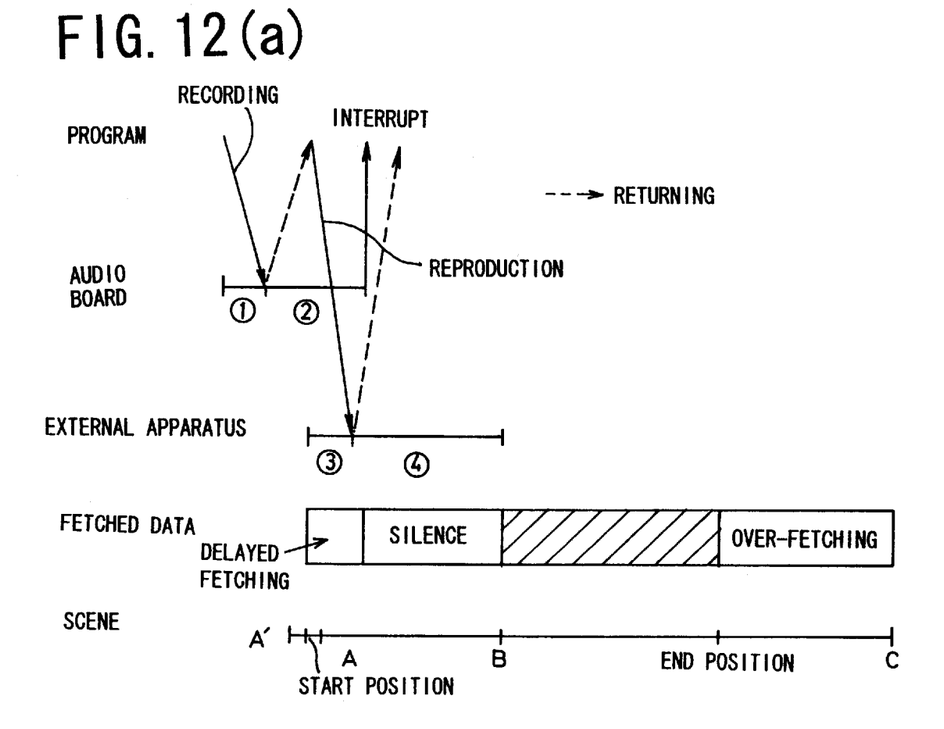
FIGS. 12(a) and 12(b) are time charts illustrating fetch processing for analog audio data in the video and audio editing system of FIG. 1.
Figure 12B:
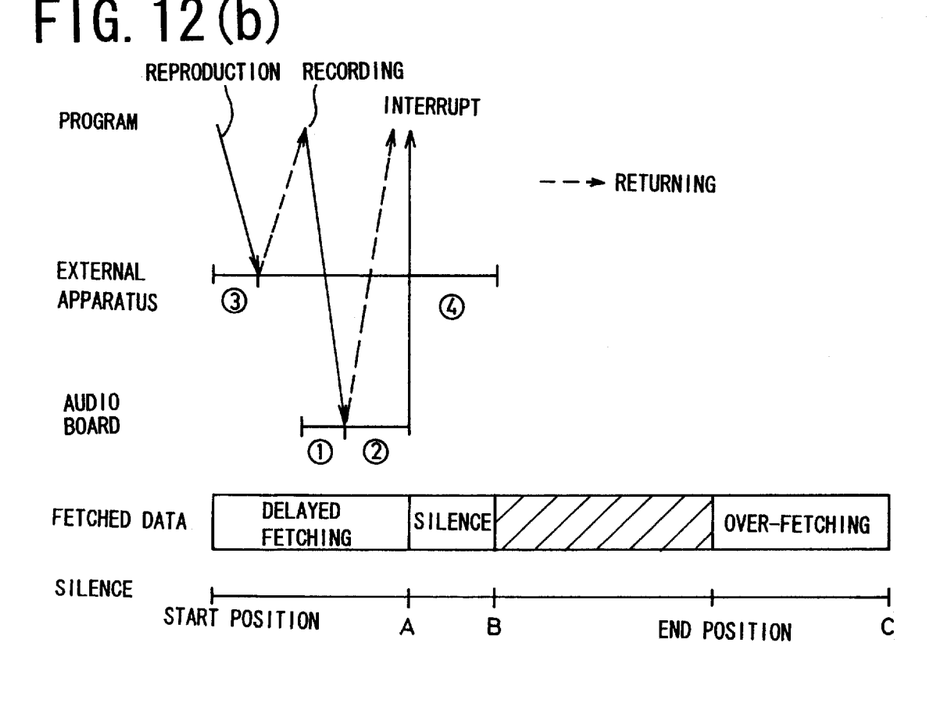

FIG. 4 is a flow chart illustrating processing accomplished by the time lag acquisition section 7 for acquiring a time lag before video data and audio data are fetched. FIG. 5 is a flow chart illustrating processing accomplished by the time lag acquisition section 7 which is different from the processing illustrated in FIG. 4. FIGS. 12 (a) and 12(b) are time charts illustrating fetching processing for analog audio data by the video and audio editing system of FIG. 1. In FIGS. 4 and 5, a request for an interruption is sent from the audio board 17 to the program 1 when the audio board 17 enters an input waiting state.

The processing which occurs when a reproduction instruction is issued after a recording instruction will be described with reference to FIGS. 4 and 12(a). If the operator controls the external apparatus 20 using the instruction inputting apparatus 23 to input fetching start and end times (step S100), then the board control section 6 sends an interrupt address to the audio board 17 (step S101), and the time lag acquisition section 7 starts a timer thereof (step S102). Then, a recording instruction is sent to the audio board 17 (step S103), followed by a reproduction instruction which is issued to the external apparatus 20 (step S104).

If a response instruction to the reproduction instruction is received from the external apparatus 20, then the current time is acquired from the system (step S105) and stored into a variable t1 (step S106). Then, when a request for interruption is received from is the audio board 17, the current time is acquired from the system (step S107) and stored into another variable t2 (step S108).

The board control section 6 controls the audio board 17 to start fetching (step S109) and transfers data inputted to the audio board 17 to the memory 14 in the personal computer 11 (step S110). After the fetching of the audio data is completed, the time lag acquisition section 7 reads the data developed in the memory 14 beginning with the top of the same for one sample (used as a unit of sampling) (step S111) and discriminates, based on the amplitude of the data, whether or not the data are silence data (representing absence of sound or silence) (step S112). When the data are silence data, the processing in steps S111 and S112 is repeated, but when the data are sound data (representing presence of sound), a time interval of the silence data (time from A to B) is calculated from the amount of data read in (step S113). Further, another time interval by which data have been fetched earlier or later than the designated start time is calculated from the variables t2−t1 (step S114). Then, the former time interval thus calculated is stored as the time lag 2 and the latter time interval is stored as the time lag 1 in units of a frame of video data (step S115).

The processing which occurs when a recording instruction is issued after a reproduction instruction will be described with reference to FIGS. 5 and 12(b). If the operator controls the external apparatus 20 using the instruction inputting apparatus 23 to input fetching start and end times (step S116), then the board control section 6 notifies an interrupt address to the audio board 17 (step S117) and the time lag acquisition section 7 acquires the current time from the system (step S118) and stores it into a variable t3 (step S119). Then, a reproduction instruction is issued to the external apparatus 20 (step S121), and then a recording instruction is issued to the audio board 17 (step S122).

Then, if a request for interruption is received from the audio board 17, the current time is acquired from the system (step S123) and stored into a variable t4 (step S124). The board control section 6 then controls the audio board 17 to start fetching (step S125) and transfers data inputted to the memory of the audio board 17 to the memory 14 in the personal computer 11 (step S126).

After the fetching is completed, the time lag acquisition section 7 reads the data for one sample developed in the memory 14 beginning with the top of the same (step S127) and discriminates, based on the amplitude of the data, whether or not the data are silence data (step S128). When the data are silence data, the processing in steps S127 and S128 is repeated. However, when the data are sound data, a time interval of the silence data (time from A to B) is calculated from the amount of data read in by the time lag acquisition section 7 (step S129). Then, another time interval during which data are fetched later than the designated start position is calculated from t4−t3 (step S130). The former time interval thus calculated is stored as the time lag 2 and the latter time interval is stored as the time lag 1 in units of a frame (step S131).

Figure 6:
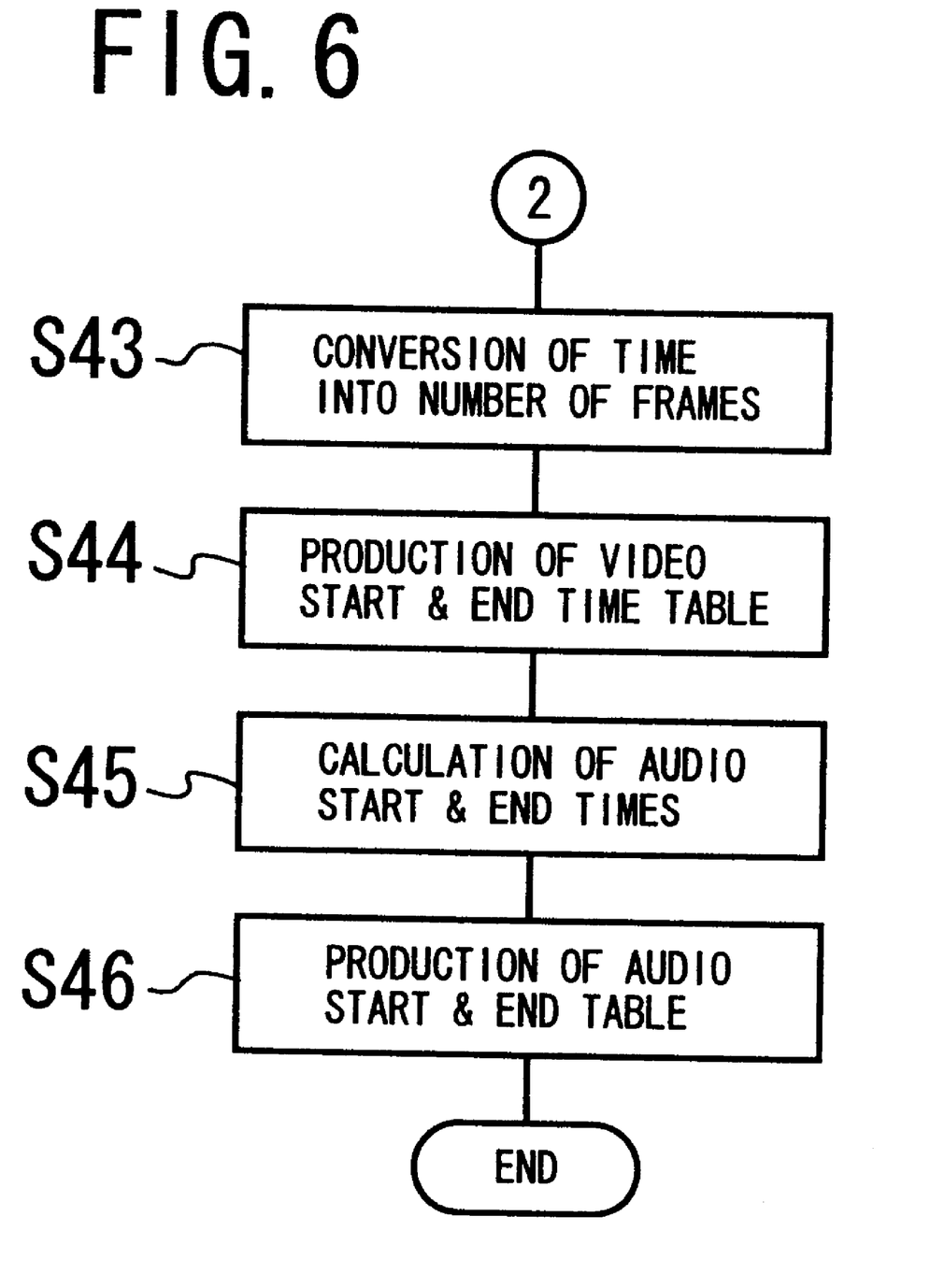
FIG. 6 is a flow chart illustrating a process for producing a table in the video and audio editing system of FIG. 1.

FIG. 6 is a flow chart of processing by the table production section 4 produces tables. Referring to FIG. 6, the table production section 4 converts start and end times of a scene inputted by an operator in units of a frame (step S43) and produces a start time table and an end time table (step S44). When video data are to be fetched, the tables are referred to.

Thereafter, from the time lags 1 and 2 calculated in the manner described above, an audio start time and an audio end time for fetching of audio data are calculated (step S45), and an audio start time table and an audio end time table are produced (step S46). The audio start time and the audio end time are calculated using the following equations.

audio start time=video start time−time lag 1 audio end time=video end time−time lag 1

Referring back to FIG. 1, when video data and audio data are to be actually fetched, an instruction to execute compression will be developed by the operator (step S9). In response to the instruction, the external apparatus control section 5 refers to the start time tables and the end time tables and controls the external apparatus 20 to return the read point to the—video start time T1 of the first scene (step S10) and then to temporarily stop (step S11). Then, the board control section 6 transfers data for one frame inputted to the memory of the video board 16 to the memory area 14 in the personal computer 11 (step S12). The video compression section 9 compresses the transferred data (step S13) and the hard disk drive unit 15 stores the compressed data onto the storage medium (step S14).

Then in step S15, the start time table and the end time table are referred to so as to confirm whether or not the video end time of the first scene has come, and when the video end time has not come as yet, the video data are fed by one frame (step S16) so that the processing in steps S11 to S16 is repeated successively feeding the frames one by one until the video end time comes.

When the video end time of the first scene comes, it is confirmed whether or not there remains another table set (step S17), and if there remains another table set, fast feeding is performed to the video start time of the second scene (step S18) and the processing in steps S11 to S16 is repeated until the video end time of the second scene comes. It is to be noted that, while it is illustrated in FIG. 7 that tables can be set for up to 20 scenes, the number of scenes is not specifically limited to 20.

After fetching of the video data is completed, fetching of audio data is started. In this instance, where the video and audio editing system is constructed such that the operations from fetching to storage of audio data cannot be performed on the real time basis, when data stored on the storage medium are to be read in, data fetched prior to fetching of actual data beginning with the audio data are skipped. This processing will be described below.

Figure 3:
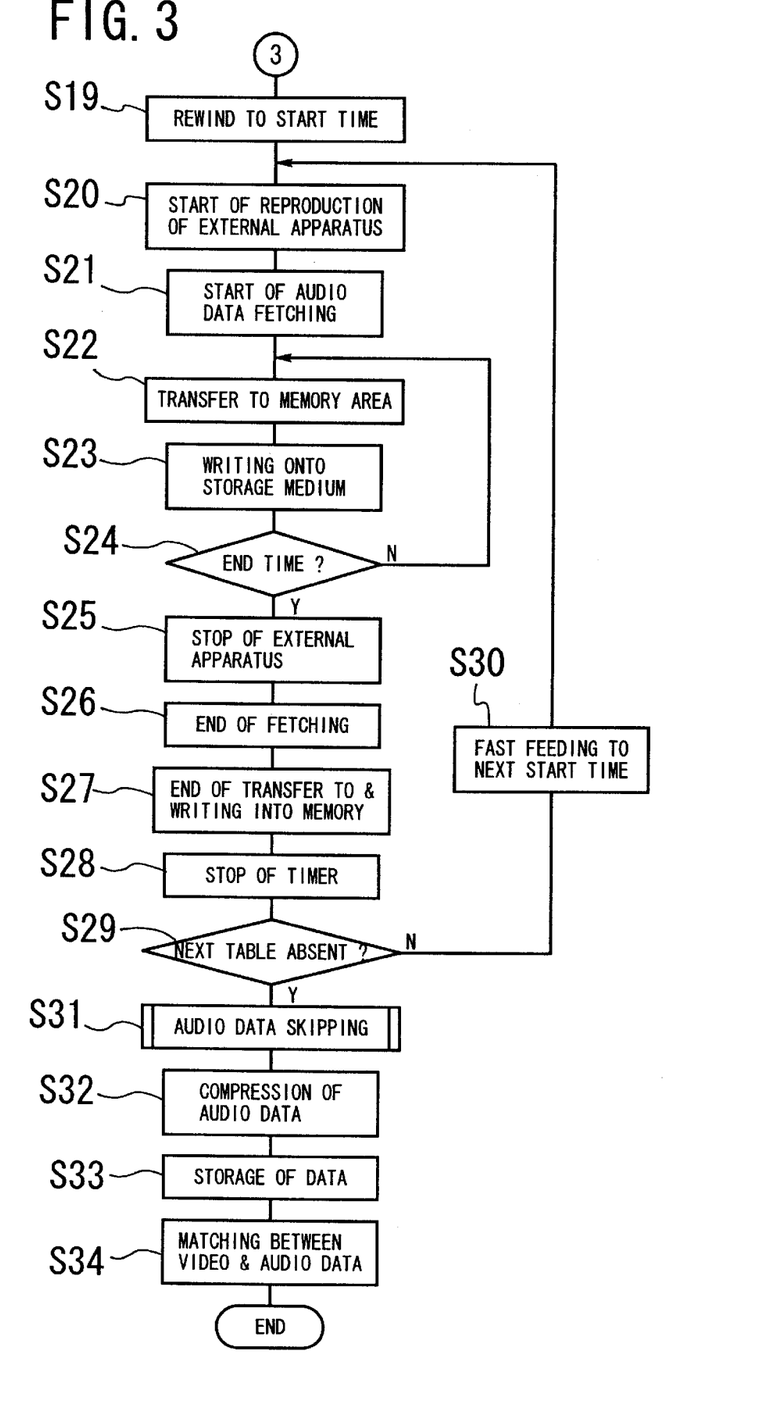
FIG. 3 is a flow chart illustrating audio data fetch processing of the video and audio editing system of FIG. 1 where the system is constructed such that fetching and storage of audio data cannot be performed on the real time basis.

FIG. 3 is a flow chart of audio data fetch processing.

Referring to FIG. 3, the external apparatus control section 5 controls the external apparatus 20 to return the read point to the audio start time of the first scene (step S19) and issues a reproduction instruction to the external apparatus 20 (step S20). Then, the board control section 6 starts fetching of the audio board 17 (step S21), transfers data inputted to the audio board 17 to the memory 14 in the personal computer 11 (step S22) and writes the data onto the storage medium by means of the hard disk drive unit 15 (step S23).

Then in step S24, the timer of the personal computer 11 is supervised by the main control section 2 (step S24), and when the audio end time of the first scene is exceeded, a stopping instruction is issued to the external apparatus 20 (step S25) and fetching of data by the audio board 17 is ended (step S26). Then, writing onto the storage medium is ended (step S27), and the timer is stopped (step S28). Thereafter, it is confirmed in step S29 whether or not there remains a set table, and if there remains a set table, fast feeding is performed until the audio start time of the second scene is reached (step S30) and then processing in steps S20 to S29 is repeated. On the contrary if there remains no set table, the data acquisition section 8 reads the stored data skipping silence data beginning with the top of the stored data (step S31), and the video and audio compression section 9 compresses the data (step S32) and the compressed data are stored onto the storage medium by the hard disk drive unit 15 (step S33). Thereafter, synchronism in time between the compressed video data and audio data is established (step S34).

Figure 8:
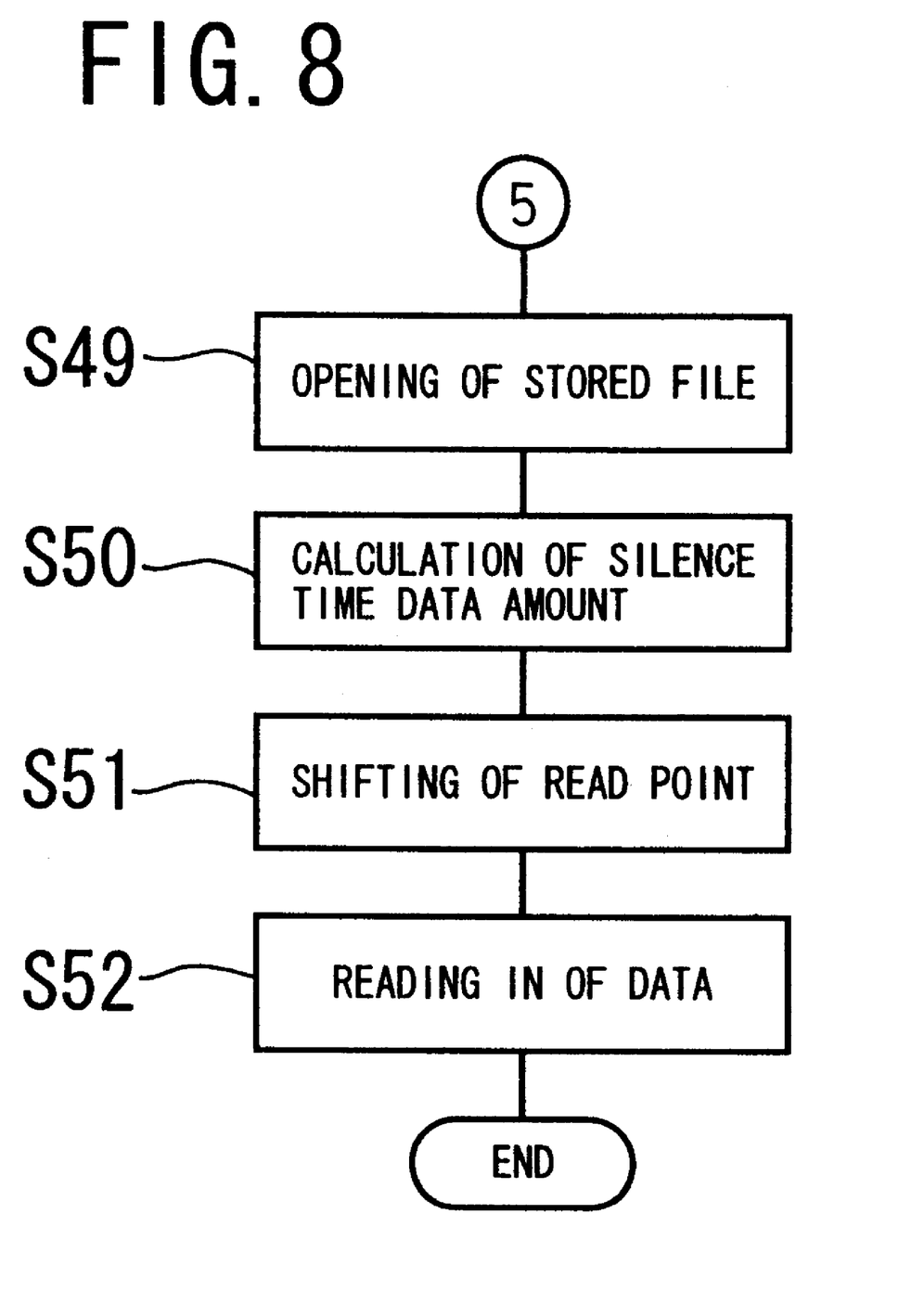
FIG. 8 is a flow chart illustrating processing for skipping silence data in the video and audio editing system of FIG. 1.

FIG. 8 is a flow chart illustrating processing for skipping silence data. Referring to FIG. 8, the data acquisition section 8 opens a file temporarily stored on the storage medium (step S49) and refers to the contents of the tables to calculate the data amount within the silence time (time lag 2) (step S50). Then, the data read point is shifted by the data amount of the silence time from the top of the file (step S51), and the data of the file beginning with the shifted position are read out into the working area established in the memory 14 (step S52).

On the other hand, the video and audio editing system may be constructed such that the operations from the fetching to the storing of audio data can be performed on a real time basis. In this case, processing for eliminating a phenomenon wherein the top of audio data exhibits silence is carried out in the following manner. When the external apparatus 20 is controlled to select video and audio data associated with a required scene in order to fetch that data into the personal computer 11, the audio data is fetched skipping silence data beginning with the top of the audio data.

In this instance, the program 1 is started, and the processing in steps S1 to S18 shown in the flow chart of FIG. 2 is performed until fetching of audio data is completed.

Figure 9:
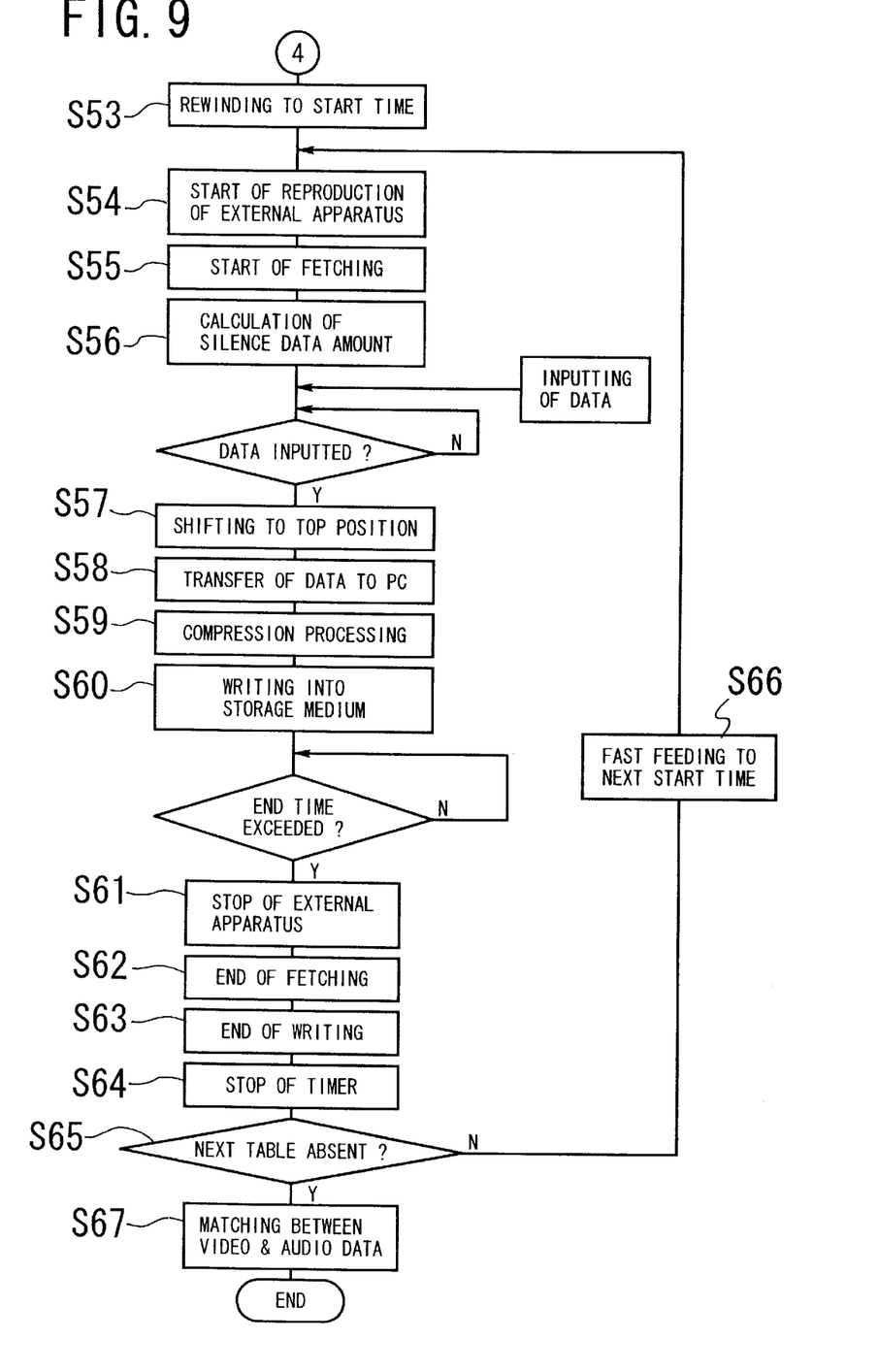
FIG. 9 is a flow chart illustrating audio data fetch processing of the video and audio editing system of FIG. 1 which is constructed such that fetching and storing of audio data can be performed on a real time basis.

Referring to FIG. 9, the external apparatus control section 5 controls the external apparatus 20 to shift the data read point back to the audio start time of the first scene, (step S53) and issues a reproduction instruction to the external apparatus 20 (step S54), and the board control section 6 starts fetching of the audio board 17 (step S55) and refers to the contents of the tables to calculate the data amount within a silence time (time lag 2) (step S56). After data are inputted to the audio board 17, the read point is shifted by the data amount of the silence time from the top of the memory area of the audio board 17 (step S57) and transfers, beginning with the shifted position, the data to the memory 14 in the personal computer 11 (step S58). Then, the video and audio compression section 9 compresses the data (step S59) and stores the data onto the storage medium (step S60). The timer of the personal computer 11 is supervised by the main control section 2, and when the audio end time is exceeded, a stopping instruction is issued to the external apparatus 20 (step S61) and the fetching of audio data is ended (step S62). Then, the writing of the audio data onto the storage medium is ended (step S63) and the timer is stopped (step S64). Then, it is confirmed whether or not there remains a table set (step S65), and if a set table remains, the read point is shifted to the audio start time of the second scene (step S66) and the processing in steps S54 to S65 is performed. If no set table remains, then synchronism in time between the compressed video and audio data is established (step S67).

Having now fully described the invention, it will be apparent to one of ordinary skill in the art that many changes and modifications can be made thereto without departing from the spirit and scope of the invention as set forth herein.

What is claimed is:

1. A video and audio editing system wherein video data and audio data are fetched from an external apparatus onto a computer via a video board and an audio board, respectively, and stored in a storage medium, the system comprising:

a start time table and an end time table for storing a processing start time and a processing end time, respectively, for each scene to be fetched from said external apparatus;

a time lag inputting means for inputting time lags inherent in fetching audio data from said external apparatus and placing said audio data on said audio board;

wherein said time lags result from the inherent time required between requesting said external apparatus to begin playing previously recorded data and said previously recorded data being copied and placed in said storage medium, a table updating means for updating the contents of said start time table and said end time table based on the inputted time lags; and a control means for referring to the contents of said start time table and said end time table to control a reading start time and a reading end time from said storage medium and reading out the audio data from said storage medium while skipping data corresponding to the time lags.

2. A video and audio editing system as claimed in claim 1, wherein said time lag inputting means includes means for acquiring a first time lag which is a time by which audio data are fetched later or earlier than the fetching start time designated by an operator and means for acquiring a second time lag which is a time by which the fetched audio data exhibit silence beginning with the top thereof, and said table updating means updates the contents of said start time table and said end time table based on the fetched first and second time lags.

3. A video and audio editing system as claimed in claim 1, wherein said time lag inputting means is an instruction inputting apparatus manually operated by an operator who independently inputs a time lag.

4. A video and audio editing system wherein video data and audio data are fetched from an external apparatus onto a computer via a video board and an audio board, respectively, and stored in a storage medium, wherein said system comprises:

a start time table and an end time table for storing a processing start time and a processing end time, respectively, for each scene to be fetched from said external apparatus;

a time lag inputting means for inputting time lags inherent in fetching audio data from said external apparatus and placing said audio data on said audio board;

wherein said time lags result from the inherent time required between requesting said external apparatus to begin playing previously recorded data and said previously recorded data being copied and placed in said storage medium, a table updating means for updating the contents of said start time table and said end time table based on the inputted time lags; and a control means for referring to the contents of said start time table and said end time table to control fetching start times and fetching end times of said video data and audio data and fetching the audio data while skipping data corresponding to the time lags.

5. A video and audio editing system as claimed in claim 4, wherein said time lag inputting means includes means for acquiring a first time lag which is a time by which audio data are fetched later or earlier than the fetching start time designated by an operator and means for acquiring a second time lag which is a time by which the fetched audio data exhibit silence beginning with the top thereof, and said table updating means updates the contents of said start time table and said end time table based on the fetched first and second time lags.

6. A video and audio editing system as claimed in claim 4, wherein said time lag inputting means is an instruction inputting apparatus manually operated by an operator who independently inputs a time lag.

7. A video and audio editing system wherein video data and audio data are fetched from an external apparatus onto a video board and an audio board, respectively, and subsequently stored in a storage medium, the system comprising:

a start time table and an end time table for storing a relative start time and a relative end time, respectively, for each scene to be fetched from said external apparatus;

a time lag inputting means for inputting time lags inherent in fetching and storing audio data from said external apparatus on said storage medium;

wherein said time lags include the inherent time required for requesting said external apparatus to begin playing previously recorded data, the external apparatus beginning to play the recorded data, the data being transferred from the external apparatus to the audio board, the audio board processing the audio data, the audio data being transferred from the audio board to the storage device, and the audio data being placed in the storage medium, a table updating means for updating the contents of said start time table and said end time table based on the inputted time lags; and a control means for referring to the contents of said start time table and said end time table to control a reading start time and a reading end time from said storage medium and reading out the audio data from said storage medium while skipping data corresponding to the time lags representative of silence.

8. A video and audio editing system as claimed in claim 7, wherein said time lag inputting means includes a means for acquiring a first time lag which is a time by which audio data are fetched later or earlier than the fetching start time designated by an operator and a means for acquiring a second time lag which is a time by which the fetched audio data exhibit silence beginning with the top thereof, and said table updating means updates the contents of said start time table and said end time table based on the fetched first and second time lags.

9. A video and audio editing system as claimed in claim 7, wherein said time lag inputting means is an instruction inputting apparatus manually operated by an operator who independently inputs time lag information.

* * * * *

UNITED STATES PATENT AND TRADEMARK OFFICE
CERTIFICATE OF CORRECTION

PATENT NO. : 5,911,030
DATED : June 8, 1999
INVENTOR(S) : Tsuneyuki KIKUCHI et al.

It is certified that error appears in the above-identified patent and that said Letters Patent is hereby corrected as shown below:

Column 4, line 1, delete "processing for" and insert --a process for producing--.

Signed and Sealed this

Twenty-eighth Day of December, 1999

Attest:

Q. TODD DICKINSON

Attesting Officer    Acting Commissioner of Patents and Trademarks